US012504139B1

(12) United States Patent
Wei

(10) Patent No.: US 12,504,139 B1
(45) Date of Patent: Dec. 23, 2025

(54) VEHICLE LAMP

(71) Applicant: JUTE INDUSTRIAL CO., LTD., Taichung (TW)

(72) Inventor: Shih-Chieh Wei, Taichung (TW)

(73) Assignee: JUTE INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 19/029,111

(22) Filed: Jan. 17, 2025

(51) Int. Cl.
*F21S 41/33* (2018.01)
*F21S 41/148* (2018.01)

(52) U.S. Cl.
CPC ............. *F21S 41/33* (2018.01); *F21S 41/148* (2018.01)

(58) Field of Classification Search
CPC ........ F21S 41/33; F21S 41/148; F21S 41/335; F21S 41/336; F21S 41/337; F21S 41/338; F21S 41/334; F21W 2107/10; F21W 2102/00; F21W 2102/13; F21W 2102/155; F21W 2103/00; F21W 2103/60; F21W 2107/13; F21W 2107/17
See application file for complete search history.

(56) References Cited

U.S. PATENT DOCUMENTS 11,698,178 B1 * 7/2023 Lee ....................... F21S 41/255 362/473

FOREIGN PATENT DOCUMENTS

| | | | | |
|---|---|---|---|---|
| CN | 108916810 B | * 11/2021 | ................ | F21V 7/00 |
| KR | 20220011406 A | * 1/2022 | ............. | F21S 43/20 |
| WO | WO-2020190027 A2 | * 9/2020 | ............. | F21S 45/48 |

OTHER PUBLICATIONS

Search English translation of WO-2020190027-A2 (Year: 2020).*
Search English translation of KR-20220011406-A (Year: 2022).*
Search English translation of CN 108916810 B (Year: 2021).*

* cited by examiner

*Primary Examiner* — Omar Rojas Cadima
(74) *Attorney, Agent, or Firm* — MUNCY, GEISSLER, OLDS & LOWE, P.C.

(57) ABSTRACT

A vehicle lamp of the present invention includes a light source and a reflector. The light source is configured to emit light. The reflector includes at least one reflecting unit configured to receive and reflect the light and including a plurality of light guide blocks arranged in a matrix. Each of the plurality of light guide blocks has a reflecting surface. The plurality of light guide blocks include a first, a second and a third light guide blocks, and the first and the third light guide blocks are respectively adjacent to the second light guide block. The reflecting surface of the first light guide block and that of the second light guide block have a first height difference, the reflecting surface of the second light guide block and that of the third light guide block have a second height difference different from the first height difference.

9 Claims, 7 Drawing Sheets

VEHICLE LAMP

BACKGROUND OF THE INVENTION

Field of the Invention

The present invention relates to a vehicle lamp.

Description of the Prior Art

A conventional vehicle lamp, such as but not limited to headlights, brake lights, or daytime running lights, includes a housing, a light source arranged within the housing, and a reflective structure surrounding the light source. The reflective structure is used to alter the light path of the light emitted from the light source in order to achieve the desired lighting effect. However, the conventional vehicle lamp generates different lighting effects by changing the quantity, distribution, brightness of the light source, or a configuration of the reflective structure. The design of the reflective structure and the lighting effects it produces are limited and lack variability. Moreover, there are issues such as high production and processing costs, poor precision, and difficulty in assembly.

The present invention is, therefore, arisen to obviate or at least mitigate the above-mentioned disadvantages.

SUMMARY OF THE INVENTION

The main object of the present invention is to provide a vehicle lamp, which produces a special lighting effect and has a reflective structure with a wide production tolerance.

To achieve the above and other objects, the present invention provides a vehicle lamp, including: a light source and a reflector. The light source is configured to emit a light. The reflector includes at least one reflecting unit configured to receive and reflect the light, the at least one reflecting unit includes a plurality of light guide blocks arranged in a matrix, and each of the plurality of light guide blocks has a reflecting surface. The plurality of light guide blocks include a first light guide block, a second light guide block and a third light guide block, and the first light guide block and the third light guide block are respectively adjacent to the second light guide block. The reflecting surface of the first light guide block and the reflecting surface of the second light guide block have a first height difference therebetween, the reflecting surface of the second light guide block and the reflecting surface of the third light guide block have a second height difference therebetween, and the first height difference is different from the second height difference.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
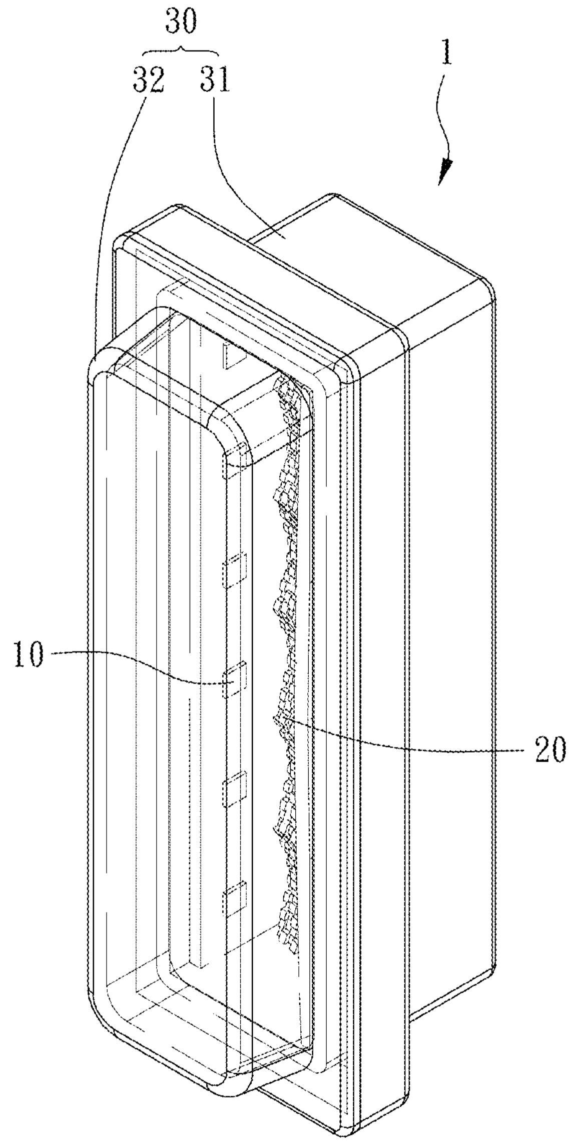
FIG. 1 is a stereogram of a preferable embodiment of the present invention.
Figure 2:
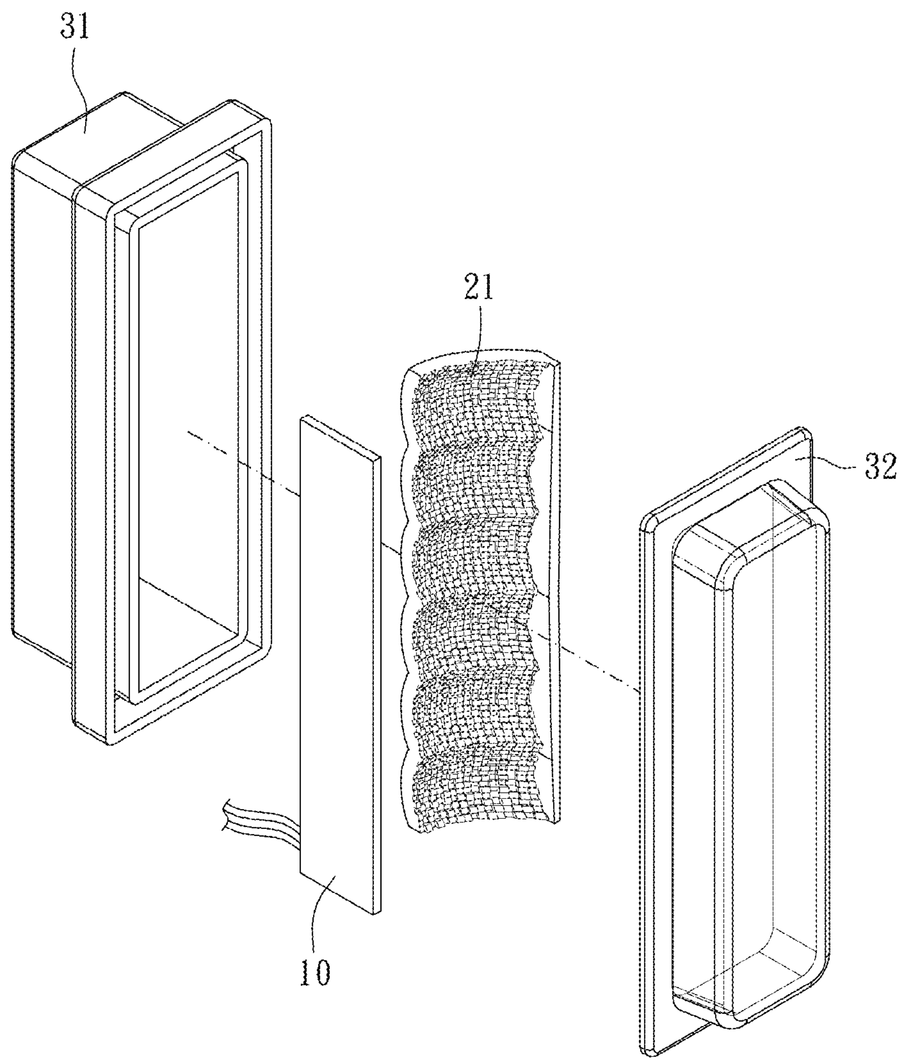
FIG. 2 is a breakdown drawing of a preferable embodiment of the present invention.
Figure 3:
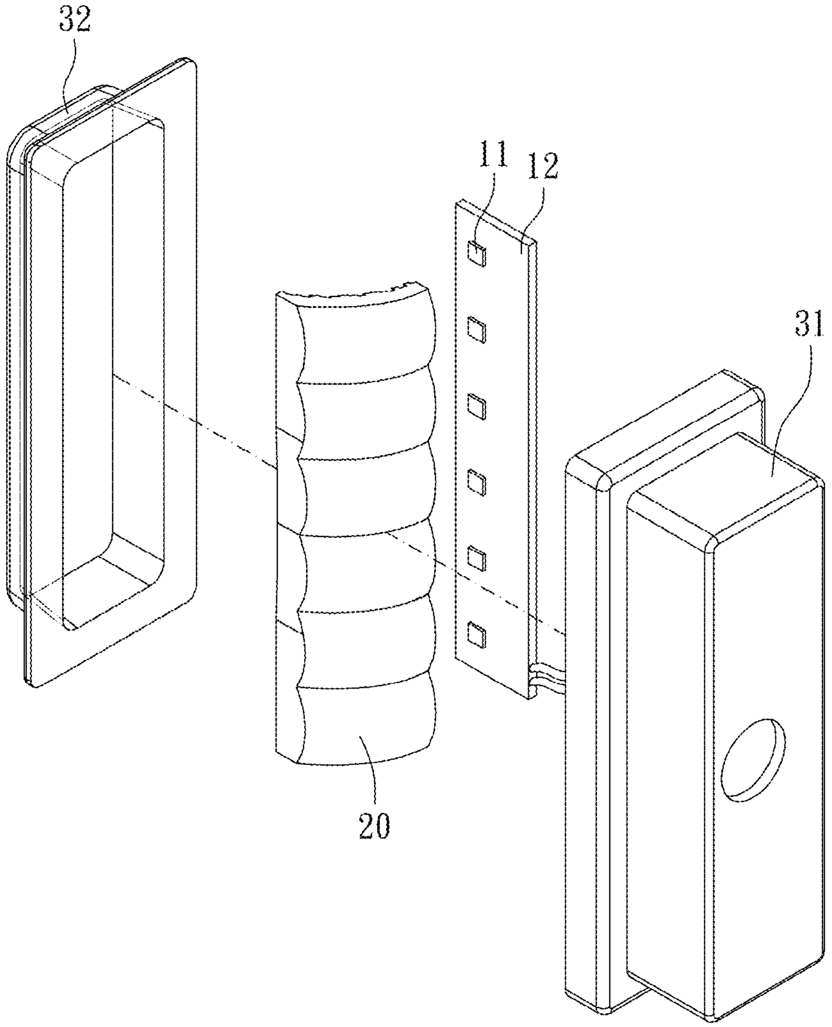
FIG. 3 is another breakdown drawing of a preferable embodiment of the present invention as viewed in another perspective.
Figure 4:
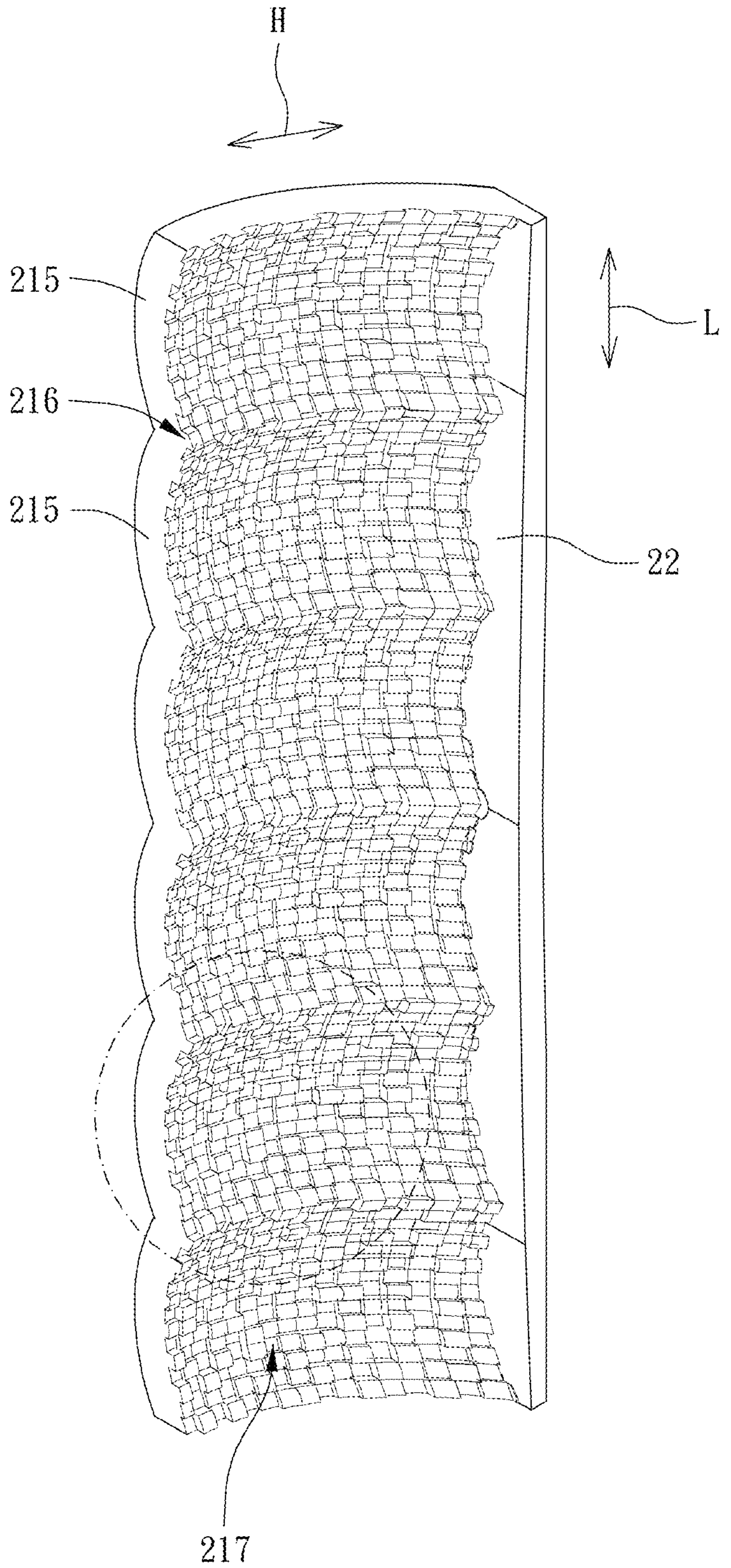
FIG. 4 is a stereogram of a reflector according to a preferable embodiment of the present invention.
Figure 5:
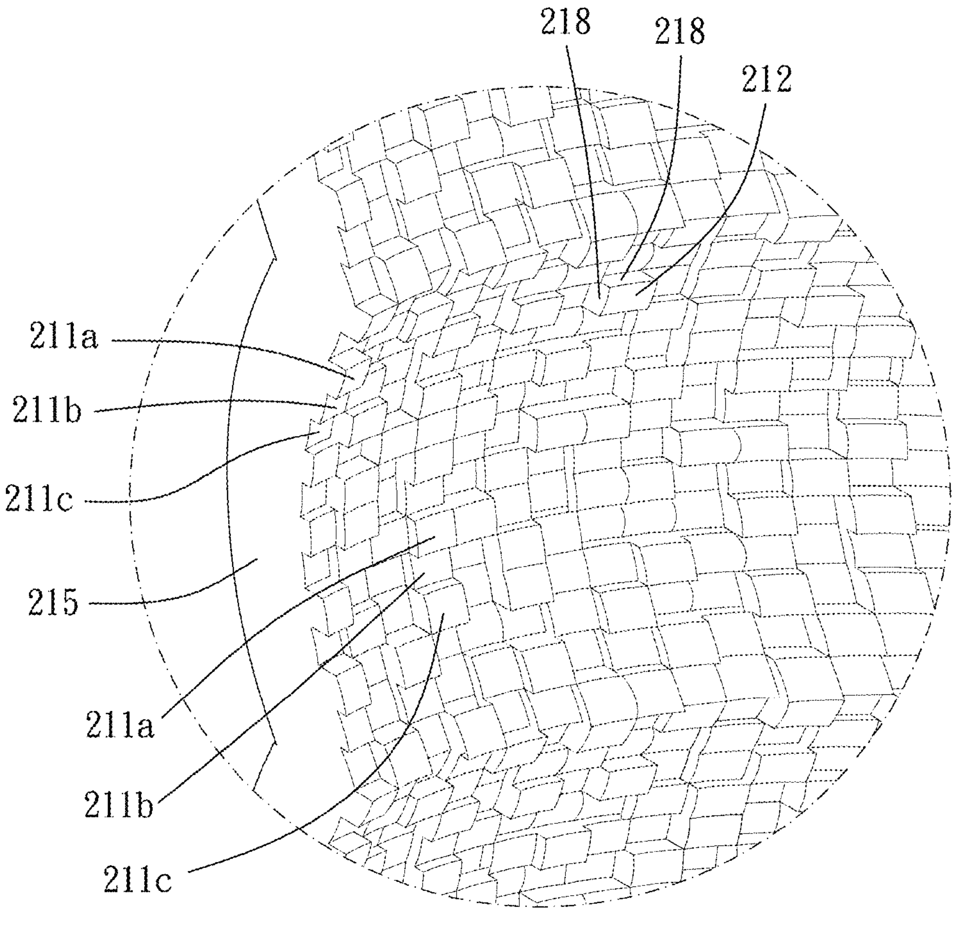
FIG. 5 is an enlargement of FIG. 4.

Please refer to FIGS. 1 to 7 for a preferable embodiment of the present invention. A vehicle lamp 1 of the present invention includes a light source 10 and a reflector 20.

The light source 10 is configured to emit a light. The reflector 20 includes at least one reflecting unit 21 configured to receive and reflect the light, the at least one reflecting unit 21 includes a plurality of light guide blocks 211 arranged in a matrix, and each of the plurality of light guide blocks 211 has a reflecting surface 212. The plurality of light guide blocks 211 include a first light guide block 211*a*, a second light guide block 211*b* and a third light guide block 211*c*, and the second light guide block 211*b* and the third light guide block 211*c* are respectively adjacent to the first light guide block 211*a*. The reflecting surface 212 of the first light guide block 211*a* and the reflecting surface 212 of the second light guide block 211*b* have a first height difference therebetween, the reflecting surface of the second light guide block 211*b* and the reflecting surface 212 of the third light guide block 211*c* have a second height difference therebetween, and the first height difference is different from the second height difference. Therefore, said reflecting surfaces 212 of the plurality of light guide blocks 211 extend discontinuously and can reflect the light in various directions so as to produce irregular light spots and a soft halo effect.

Figure 6:
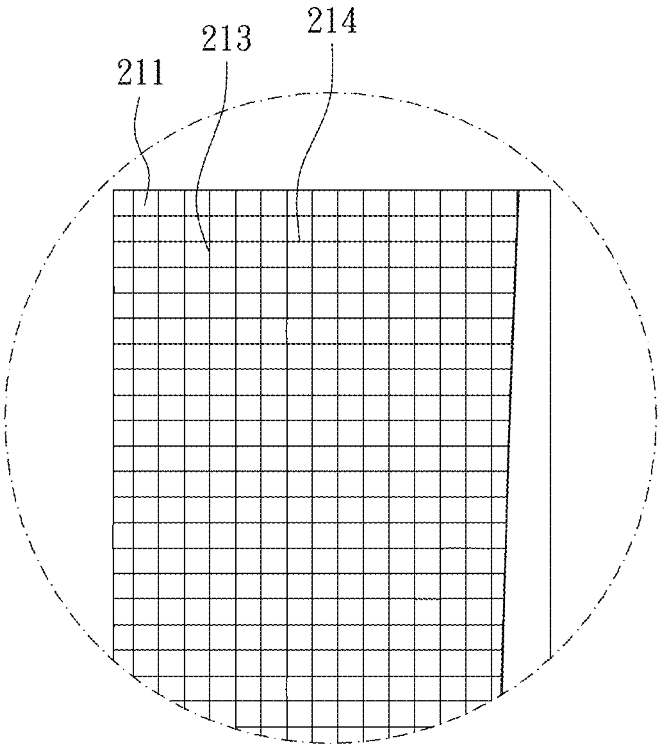
FIG. 6 is a partial side view of the reflector according to a preferable embodiment of the present invention.
Figure 7:
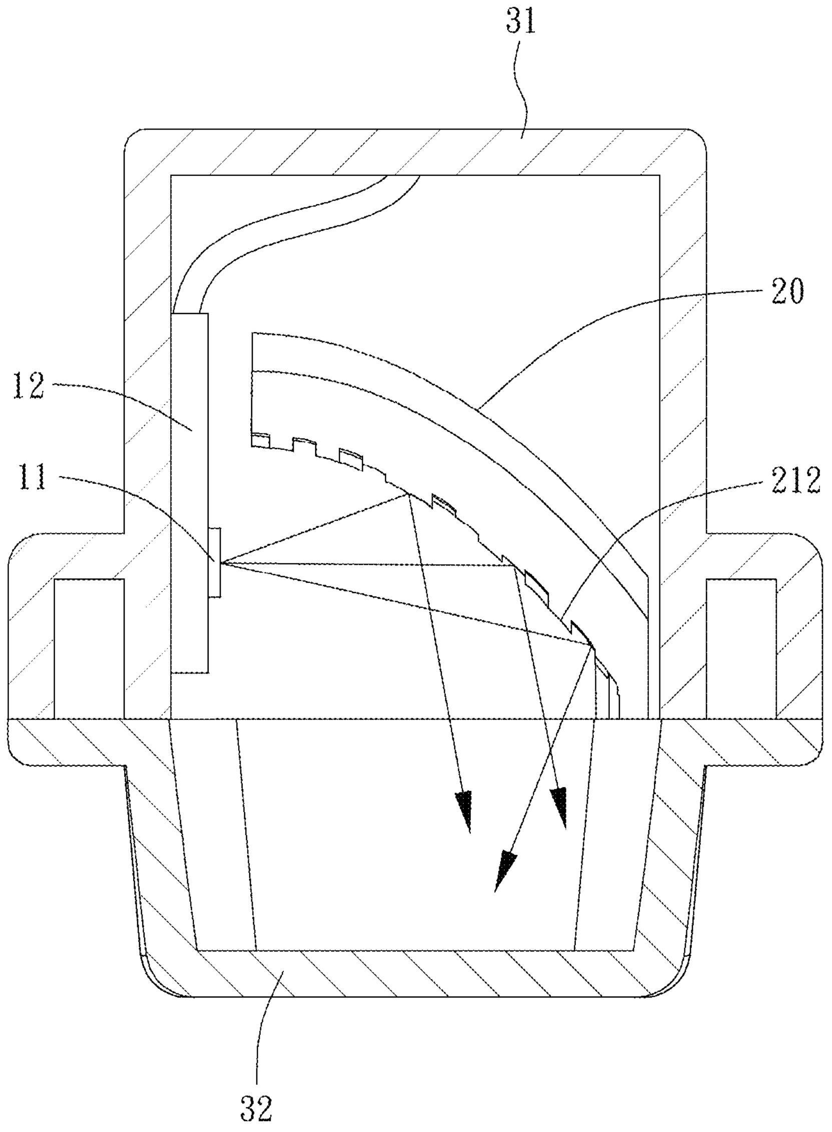
FIG. 7 is a cross-sectional view of a preferable embodiment of the present invention.

Preferably, each of the plurality of light guide blocks 211 has a rectangular outer profile, as viewed in a side of the reflector 20, the plurality of light guide blocks 211 are adjacently connected with one another and form a plurality of plurality of longitudinal line 213 and a plurality of horizontal lines 214 intersect vertically with one another, as shown in FIG. 6. The plurality of light guide blocks 211 may be formed by compression molding, injection molding, or the like, which is easy to design and produce. Each said reflecting surface 212 may be a flat surface, a convex surface, a concave surface, or include multiple irregular facets, which can be designed according to the requirements to produce different lighting effects.

In this embodiment, dimensions of cross-sectional profiles of the plurality of light guide blocks 211 are the same; the first light guide block 211*a*, the second light guide block 211*b* and the third light guide block 211*c* are arranged in the same column or row of the matrix. Preferably, height differences between the reflecting surface 212 of the first light guide block 211*a* and said reflecting surfaces 212 of four said light guide blocks 211 adjacent to the first light guide block 211*a* are different from one another. Each of the plurality of light guide blocks 211 further includes a plurality of side surfaces 218 lateral to and adjacently connected with the reflecting surface 212, and the plurality of side surfaces 218 are configured to reflect the light so that the light emitted from the light source may interfere with each other or undergo multiple reflections, resulting in a better reflective effect.

Specifically, the reflector 20 includes a plurality of said reflecting units 21 connected with one another, each said reflecting unit 21 includes a substrate 215 extending arcuately and concavely, and every adjacent two of said substrates 215 form a spine portion 216 therebetween. The plurality of light guide blocks 211 integrally project from a concave side 217 of the substrate 215 to receive and partially focus the light. The light source 10 includes a plurality of lighting members 11 and a circuit board 12, each of the plurality of lighting members 11 faces toward one of said reflecting units 21 and is misaligned with each said spine portion 216, and a number of the plurality of lighting members is equal to a number of the plurality of reflecting unit so that the light emitted from the plurality of lighting members 11 is effectively projected onto said concave sides 217. Each said substrate 215 extends arcuately in both a longitudinal direction L and a horizontal direction H lateral to the longitudinal direction L so that said reflecting surfaces 212 are arranged in a generally concave pattern, allowing the light to interfere with each other and produce a light scattering effect.

Specifically, the vehicle lamp 1 of the present invention achieves different degrees of interference and reflection of the light by utilizing varying height differences between said reflecting surfaces 212 and curvatures of said substrates 215, thereby providing a unique lighting effect. Even with slight precision deviations in the height differences between said reflecting surfaces 212, a similar effect can still be achieved, offering a wider production tolerance and facilitating manufacturing.

The vehicle lamp 1 further includes a housing 30, and the housing 30 includes a base 31 and a cover 32 covered on the base 31. The reflector 20 further includes a mounting portion 22 connected to a side of the at least one reflecting unit 21, the light source 10 and the mounting portion 22 are respectively positioned on two opposite sidewalls of the base 31, and the plurality of said reflecting units 21 extend from the mounting portion 22 toward the light source 10, which has a simple structure and is easy to assemble. The circuit board 12 and the reflector 20 are preferably spaced apart from each other, allowing for easy maintenance and replacement. When the light emitted from the light source 10 is directed toward the reflector 20, the structure of the reflector 20 and the arrangement of the plurality of lighting members 11 enable the vehicle lamp 1 to generate light spots with varying densities and a soft halo effect.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle lamp, including:

a light source, configured to emit a light; and a reflector, including a plurality of reflecting units connected with one another and configured to receive and reflect the light, each of the plurality of reflecting units including a plurality of light guide blocks arranged in a matrix, each of the plurality of light guide blocks having a reflecting surface;

wherein the plurality of light guide blocks of each of the plurality of reflecting units include a first light guide block, a second light guide block and a third light guide block, the first light guide block and the third light guide block are respectively adjacent to the second light guide block, the reflecting surface of the first light guide block and the reflecting surface of the second light guide block have a first height difference therebetween, the reflecting surface of the second light guide block and the reflecting surface of the third light guide block have a second height difference therebetween, and the first height difference is different from the second height difference;

wherein each of the plurality of reflecting units includes a substrate extending arcuately and concavely, every adjacent two of said substrates form a spine portion therebetween, and the plurality of light guide blocks integrally project from a concave side of the substrate.

2. The vehicle lamp of claim 1, wherein each of the plurality of light guide blocks has a rectangular outer profile, as viewed in a side of the reflector, the plurality of light guide blocks are adjacently connected with one another and form a plurality of longitudinal lines and a plurality of horizontal lines intersect vertically with one another.

3. The vehicle lamp of claim 1, wherein dimensions of cross-sectional profiles of the plurality of light guide blocks are the same.

4. The vehicle lamp of claim 1, wherein the first light guide block, the second light guide block and the third light guide block are arranged in the same column or row of the matrix.

5. The vehicle lamp of claim 1, wherein height differences between the reflecting surface of the first light guide block and said reflecting surfaces of four said light guide blocks adjacent to the first light guide block are different from one another.

6. The vehicle lamp of claim 1, further including a housing, wherein the housing includes a base and a cover covered on the base, the reflector further includes a mounting portion connected to a side of the plurality of reflecting units, the light source and the mounting portion are respectively positioned on two opposite sidewalls of the base, and the plurality of reflecting units extend from the mounting portion toward the light source.

7. The vehicle lamp of claim 1, wherein the light source includes a plurality of lighting members, each of the plurality of lighting members faces toward one of said reflecting units and is misaligned with each said spine portion.

8. The vehicle lamp of claim 1, wherein each said substrate extends arcuately in both a longitudinal direction and a horizontal direction lateral to the longitudinal direction.

9. The vehicle lamp of claim 8, wherein each of the plurality of light guide blocks has a rectangular outer profile, as viewed in a side of the reflector, the plurality of light guide blocks are adjacently connected with one another and form a plurality of longitudinal lines and a plurality of horizontal lines intersect vertically with one another; dimensions of cross-sectional profiles of the plurality of light guide blocks are the same; the first light guide block, the second light guide block and the third light guide block are arranged in the same column or row of the matrix; height differences between the reflecting surface of the first light guide block and said reflecting surfaces of four said light guide blocks adjacent to the first light guide block are different from one another; the vehicle lamp further includes a housing, the housing includes a base and a cover covered on the base, the reflector further includes a mounting portion connected to a side of the plurality of said reflecting units, the light source and the mounting portion are respectively positioned on two opposite sidewalls of the base, and the plurality of reflecting units extend from the mounting portion toward the light source; the light source includes a plurality of lighting members, each of the plurality of lighting members faces toward one of said reflecting units and is misaligned with each said spine portion; a number of the plurality of lighting members is equal to a number of the plurality of reflecting units; and each of the plurality of light guide blocks further includes a plurality of side surfaces lateral to and adjacently connected with the reflecting surface, and the plurality of side surfaces are configured to reflect the light.

* * * * *